June 17, 1930.  H. O. PETERSON  1,764,747

DIRECTION FINDER

Filed Nov. 18, 1925

INVENTOR
HAROLD O. PETERSON
BY
Ira J. Adams
ATTORNEY

Patented June 17, 1930

1,764,747

UNITED STATES PATENT OFFICE

HAROLD O. PETERSON, OF RIVERHEAD, NEW YORK, ASSIGNOR TO RADIO CORPORATION OF AMERICA, A CORPORATION OF DELAWARE

DIRECTION FINDER

Application filed November 18, 1925. Serial No. 69,752.

This invention relates to direction finding of radio signals. It has for its object a counteraction of any effects which are inherent in the natural surroundings of the direction finding apparatus.

This is accomplished in general by producing other errors which have a counteracting effect upon the natural error.

It has for its further object the reduction of static and induction action caused by sparking commutators, swinging grounds and other disturbing influences. To obtain this result a shielding loop is used having the proper characteristics and the right position in respect to the surroundings. This loop is to compensate for the error of radio compass bearings which accrue as a result of the signal inducing circulating currents in the metal circuits of the ship such as rigging, etc. By experimental observations we can find the plane of the circuit through which these induced currents flow. We then place the plane of the permanent fixed loop at right angles to the plane of the error producing currents and couple the loop to our direction finder loop by an amount sufficient to give us true bearings.

This system has been tried and found effective, the results in practice being as above outlined. The compensating loop can often be of the simple form of another stay to the fore mast if the mast is of metal.

Further and more particular objects may be observed with reference to the following specification, claims and annexed drawing, in which:—

1 is the hold of a ship being of steel, wood or other material on which my device is located.

The overhead antenna 5 with its lead-in wire 6 is used for ordinary sending and receiving. A direction finding loop or antenna 4 may also be used when it is desired to determine the direction to which or from which the signal is sent or received.

3 indicates a means by which a correction of errors caused by the natural loops formed by the various masts, ropes, antenna, wires, etc. is made.

Figure 2:
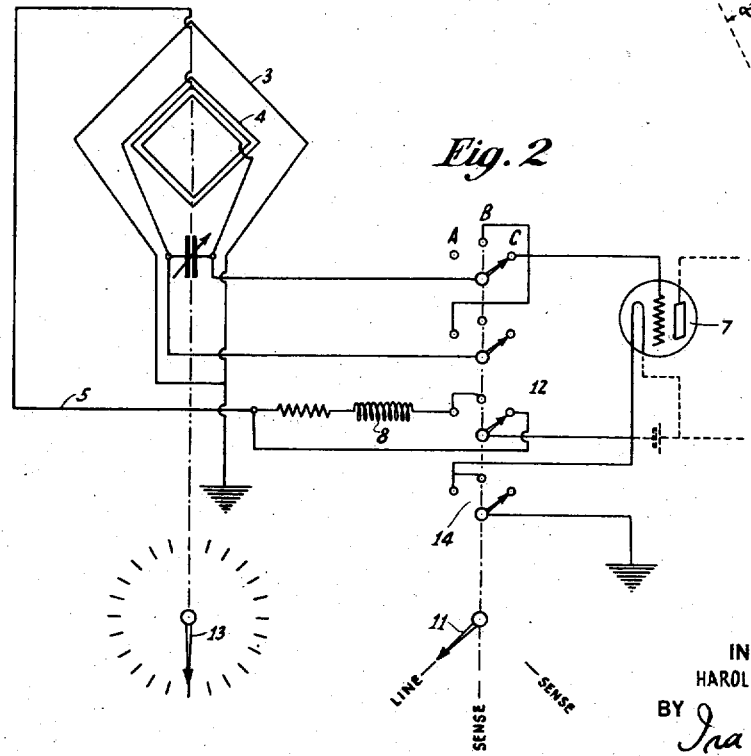
Fig. 2 shows a schematic wiring diagram with connecting devices.

The directional antenna 4 is connected to a switching arrangement as indicated at 12 Figure 2. This switching arrangement is used to aid in the determining of the direction so that it will not be necessary to rotate the loop through 180 degrees in order to obtain the customary cardioid receiving characteristic. There is also provided a series of contacts for use in obtaining the direction by means of the double null point method. These different series are indicated by the letters A, B and C, respectively.

The loop as indicated in Fig. 2 is of the conventional type, having a tuning condenser. It has been found advantageous to use the square type mounted on one of its angles. 7 is a radio receiver amplifier or equivalent which is used for indicating oscillations. The position of the loop is determined by the indicator 13 associated with the proper scale. Surrounding the antenna 4 is a shielding loop 3 which is grounded or not as desired. This loop is so proportioned as to have an equivalent effect upon the antenna 4 as the natural surrounding loop structure of the ship. This proportion may be obtained by the amount of coupling with the antenna, insertion of resistance or reactance into the shielding circuit or in the ground circuit.

Whenever a switching arrangement 12 is set to connect the loop in the figure 8, or double null-point receiving location as indicated by "line" on Fig. 2, one-half of the loop is thrown directly across the input of the vacuum tube 7. Whenever a direction is determined by the cardioid or sense method, the switching arrangement contacts with the circuit to the mid-point of the loop through 8 and 5. 8 is the proper resistance and impedance to give the proper vertical antenna exposure to give a cardioid receiving diagram. As will appear from this figure, whenever these contacts are at A or B only one-half the loop 4 will be found to be in circuit. The other half will be open-circuited and a connection will be made through the conductor 5. In this connection it will be necessary to use the loop to receive both the horizontal and vertical components of the signal wave so that the loop must be connected to the ground through the contacts A or B at 14.

Figure 1:
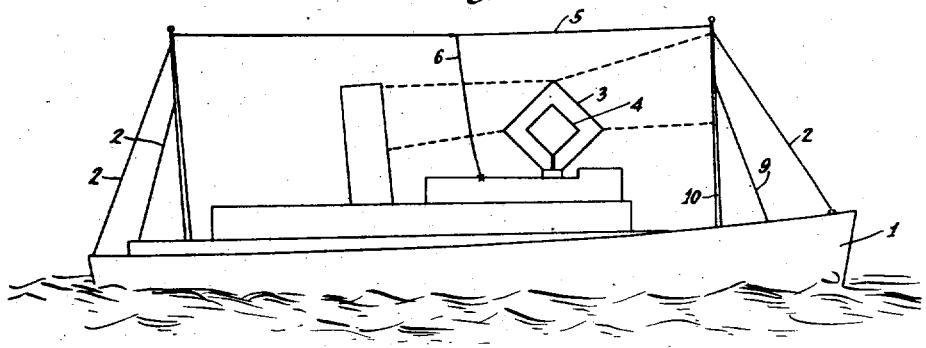
Fig. 1 shows a view of the location of a particular adaptation of my arrangement.
Figure 3:
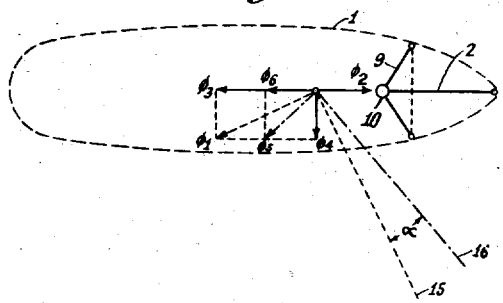
Fig. 3 shows a vectorial analysis of the errors occurring therein.

In regard to the effects produced by the natural surrounding loops and the loop 3, the line 15 in Fig. 3 indicates the true direction of a given radio signal and 16 is the direction at which it would appear to lie if no correction means were used, due to the loop effects of the surrounding conductors. $\phi_1$ is the normal signal flux. It can be broken into two components at right angles, $\phi_3$ and $\phi_4$. $\phi_3$ cuts the rigging loop (which is probably almost pure inductance) setting up a circulating current which has a magnetic field $\phi_2$ nearly 180° out of phase with $\phi_3$. This flux shortens $\phi_3$ to $\phi_6$. $\phi_4$ remains the same. Hence the resultant is now that of $\phi_6$ and $\phi_4$ which is $\phi_5$. The bearing of the signal will consequently appear to be in a line perpendicular to $\phi_5$ which is quite a bit in error as indicated by the angle $\alpha$ in Fig. 3. Now if we place another loop at right angles to the ship's rigging, it will have a tendency to produce errors of bearing in the opposite direction by shortening $\phi_4$ as well as $\phi_3$, resulting in a cancellation of the error producing effects of the ship's rigging.

Furthermore, the phase angles of the fluxes resulting from the currents caused to flow in the extraneous circuits of the vicinity are usually such as to make the bearing of minimum response dull and ill defined in certain directions. This dullness is most marked in the directions where the error of bearing is greatest. The distinctness of the bearing on the radio compass is automatically made good when the compensating loop is adjusted to correct the errors of bearing.

It can be seen from this that a simple and effective method is herein provided for correction of errors due to natural surroundings and it is not intended that this idea be limited to the use of ships alone but also to any other natural surroundings having a definite directional error producing characteristic.

I claim :—

1. The combination with directional finding equipment, and natural circuits adjacent thereto which cause error producing magnetic flux, of a fixed closed loop arranged in proper position and size to cause error compensating magnetic flux of such direction and magnitude that the resultant space signal applied to the direction finding equipment is unchanged in direction, and means for causing said loop to act as an electrostatic shield with respect to said direction finding equipment, including a connection between said loop and ground.

2. The combination with direction finding pickup means located on shipboard and the natural circuits adjacent thereto provided by the ship's structure and rigging which cause error producing magnetic flux, of a fixed loop located adjacent the pickup means in proper position and size to cause error compensating magnetic flux of such direction and magnitude that the resultant space signal applied to the pickup means is unchanged in direction, and means for causing said loop to act as an electrostatic shield with respect to said direction finding pickup means, including a connection between said loop and ground.

3. The combination with a rotatable loop located on shipboard for direction finding, and the natural circuits adjacent thereto provided by the ship's structure and rigging which causes error producing magnetic flux, of an auxiliary fixed loop built adjacent the pickup means in proper position and size to cause error compensating magnetic flux of such direction and magnitude that the resultant space signal applied to the rotatable loop is unchanged in direction of propagation and means for causing said auxiliary loop to act as an electrostatic shield with respect to said rotatable loop, including a connection between said auxiliary loop and the ground.

4. The method of direction finding by means of a directional pickup and a receiver inherently subjected to pointing deviations due to a signal wave front distorted by adjacent metallic structures which includes the step of setting up a local field equal in amplitude and opposite in phase to the error producing field of said wave front, and simultaneously producing an electrostatic shield effect around said directional pickup and receiver.

HAROLD O. PETERSON.